(12) United States Patent
Ebihara et al.

(10) Patent No.: US 11,240,458 B2
(45) Date of Patent: Feb. 1, 2022

(54) IMAGE SENSOR WITH CAPACITOR RANDOMIZATION FOR COLUMN GAIN

(71) Applicant: OMNIVISION TECHNOLOGIES, INC., Santa Clara, CA (US)

(72) Inventors: Hiroaki Ebihara, San Jose, CA (US); Rui Wang, San Jose, CA (US); John Brummer, Saratoga, CA (US); Shan Chen, Sunnyvale, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 6 days.

(21) Appl. No.: 16/900,576

(22) Filed: Jun. 12, 2020

(65) Prior Publication Data

US 2021/0392286 A1    Dec. 16, 2021

(51) Int. Cl.
*H04N 5/378* (2011.01)
*H04N 5/365* (2011.01)
*H04N 5/355* (2011.01)

(52) U.S. Cl.
CPC .......... *H04N 5/378* (2013.01); *H04N 5/3559* (2013.01); *H04N 5/3658* (2013.01)

(58) Field of Classification Search
CPC ..... H04N 5/378; H04N 5/3658; H04N 5/3559
See application file for complete search history.

(56) References Cited

U.S. PATENT DOCUMENTS

| 7,382,408 | B2 * | 6/2008 | Rossi | H04N 5/378 |
| | | | | 348/308 |
| 7,535,391 | B1 * | 5/2009 | Newman | H03M 1/0673 |
| | | | | 341/131 |
| 2005/0168602 | A1 * | 8/2005 | Sumi | H04N 5/3575 |
| | | | | 348/294 |
| 2011/0001039 | A1 * | 1/2011 | Hoshino | H04N 5/3742 |
| | | | | 250/208.1 |
| 2011/0032404 | A1 * | 2/2011 | Kikuchi | H04N 5/378 |
| | | | | 348/300 |
| 2013/0341489 | A1 * | 12/2013 | Yoshida | H04N 5/378 |
| | | | | 250/208.1 |
| 2015/0022702 | A1 * | 1/2015 | Kim | H04N 5/378 |
| | | | | 348/301 |
| 2015/0296163 | A1 * | 10/2015 | Nakamura | H04N 5/378 |
| | | | | 348/308 |
| 2016/0050381 | A1 * | 2/2016 | Onishi | H04N 5/378 |
| | | | | 348/300 |
| 2020/0260034 | A1 * | 8/2020 | Moue | H01L 27/14609 |

* cited by examiner

*Primary Examiner* — Nhan T Tran
(74) *Attorney, Agent, or Firm* — Christensen O'Connor Johnson Kindness PLLC

(57) ABSTRACT

A pixel cell readout circuit includes a bitline input stage coupled to a bitline to receive an image signal from a pixel cell. A capacitor ratio circuit is coupled to the bitline input stage. A gain of the bitline input stage is responsive to a capacitor ratio provided by the capacitor ratio circuit to the bitline input stage. A switch control circuit is coupled to receive a gain signal. The switch control circuit is coupled to generate a randomized pattern selection signal coupled to be received by the capacitor ratio circuit to select the capacitor ratio provided by the capacitor ratio circuit in response to the gain signal.

40 Claims, 5 Drawing Sheets

IMAGE SENSOR WITH CAPACITOR RANDOMIZATION FOR COLUMN GAIN

BACKGROUND INFORMATION

Field of the Disclosure

This disclosure relates generally to image sensors, and in particular but not exclusively, relates to complementary metal oxide semiconductor (CMOS) image sensors with column gain.

Background

Image sensors have become ubiquitous and are now widely used in digital cameras, cellular phones, security cameras, as well as, medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (i.e., image data) representing the external scene. The analog image signals on the bitlines are coupled to readout circuits, which include input stages having analog-to-digital conversion (ADC) circuits to convert that analog image signals from the pixel array into the digital image signals.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
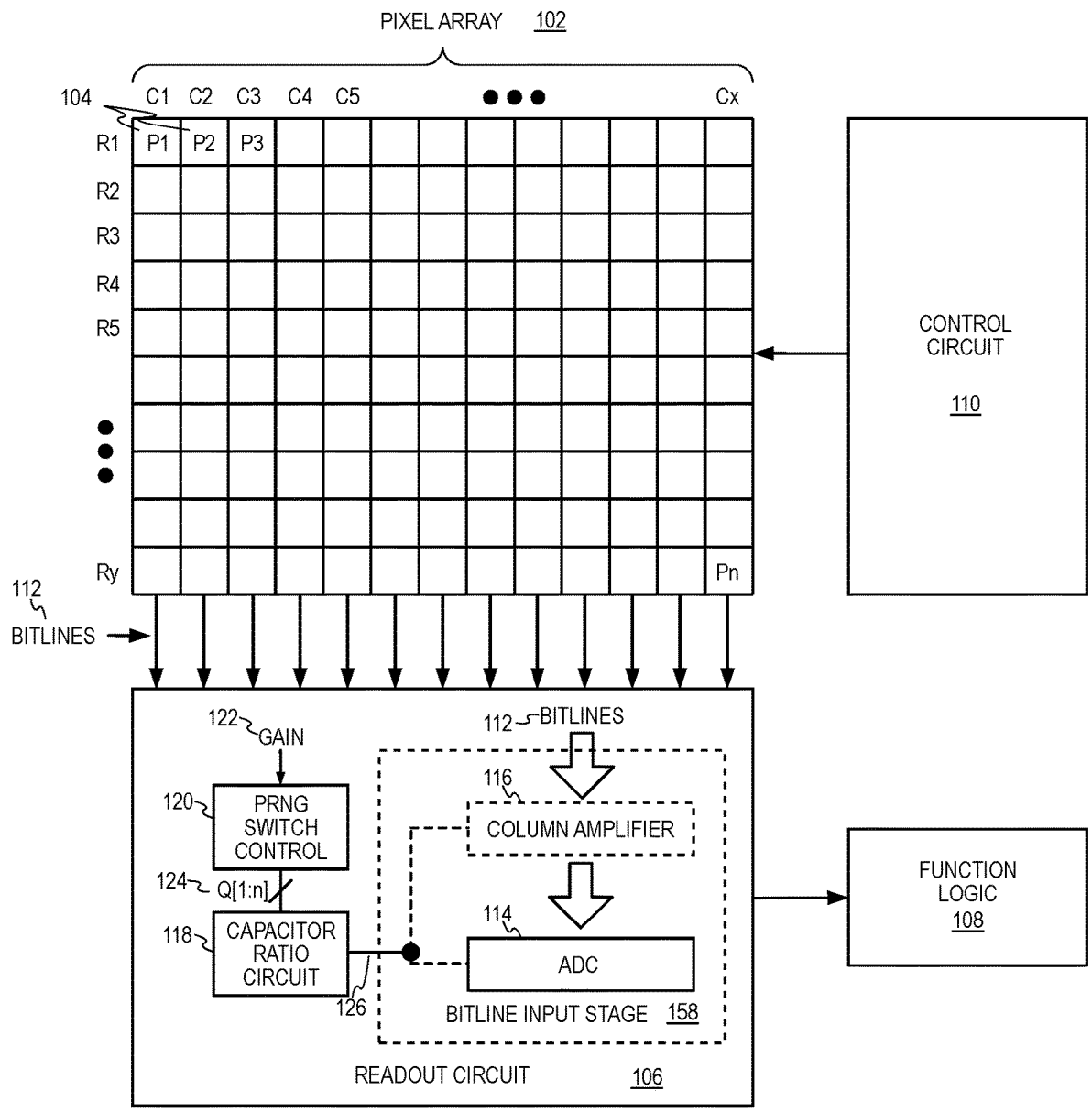
FIG. 1 illustrates one example of an imaging system with a readout circuit providing column gain with capacitor in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Various examples directed to an imaging system with a readout circuit providing column gain with capacitor randomization are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with a readout circuit providing column gain with capacitor randomization are described. In various examples, connections to capacitors that set the gain of a readout circuit of an imaging system are changed in a random manner while still providing the desired gain to reduce vertical fixed pattern noise that can be caused by mismatched capacitors in the imaging system.

To illustrate, FIG. 1 illustrates one example of a complementary metal oxide semiconductor (CMOS) imaging system 100 with a readout circuit providing column gain with capacitor randomization in accordance with the teachings of the present invention. In the example, the imaging system 100 includes a pixel array 102, a control circuit 110, a readout circuit 106, and function logic 108. In one example, pixel array 102 is a two-dimensional (2D) array including a plurality of pixel cells 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

After each pixel cell 104 has acquired its image charge, the corresponding analog image signals are read out by readout circuit 106 through column bitlines 112. In the various examples, readout circuit 106 includes a bitline input stage 158 coupled to bitlines 112 to receive the image signals from the pixel cells 104 of pixel array 102. A capacitor ratio circuit 118 is coupled to the bitline input stage 112. As will be discussed in greater detail below, the capacitor ratio circuit 118 is coupled to provide capacitance connections having a capacitor ratio to the bitline input stage 158 to set the desired gain.

In various examples, the bitline input stage 158 includes an analog-to-digital conversion (ADC) circuit 114, which is coupled to convert the analog image signals received from the pixel cells 104 through bitlines 112 to digital image signals. In one example, the ADC circuit 114 includes circuitry that provides column gain. In another example, an optional column amplifier 116 with gain may be included. When included, the column amplifier 116 is coupled between the bitlines 112 and the ADC circuit 114 to amplify the analog image signals from the bitlines 112 that are received by the ADC circuit 114. In both examples, the gain of the bitline input stage 158 is responsive to a capacitor ratio provided by the capacitor ratio circuit 118 to the bitline input stage 158 in accordance with the teachings of the present invention.

In the examples, a switch control circuit 120 is coupled to receive a gain signal 122 to control the gain of the bitline input stage 158. The switch control circuit 120 is coupled to generate a randomized pattern selection signal 124, which is coupled to be received by the capacitor ratio circuit 118 to select the capacitor ratio provided by the capacitor ratio circuit 118 in response to the gain signal 122. Thus, the gain of the bitline input stage 158 is determined by the capacitor ratio provided by the capacitor ratio circuit 118 in response to randomized pattern selection signal 124 received from the switch control circuit 120 in accordance with the teachings of the present invention.

In one example, a control circuit 110 is coupled to pixel array 102 to control operational characteristics of pixel array 102. For instance, in one example, control circuit 110 generates the transfer gate signals and other control signals to control the transfer and readout of image data from all of the pixel cells 104 of pixel array 102. In addition, control circuit 110 may generate a shutter signal for controlling image acquisition. In one example, the shutter signal is a rolling shutter signal such that each row of the pixel array 102 is read out sequentially row by row during consecutive acquisition windows. The shutter signal may also establish an exposure time, which is the length of time that the shutter remains open. In one embodiment, the exposure time is set to be the same for each of the frames.

Figure 2:
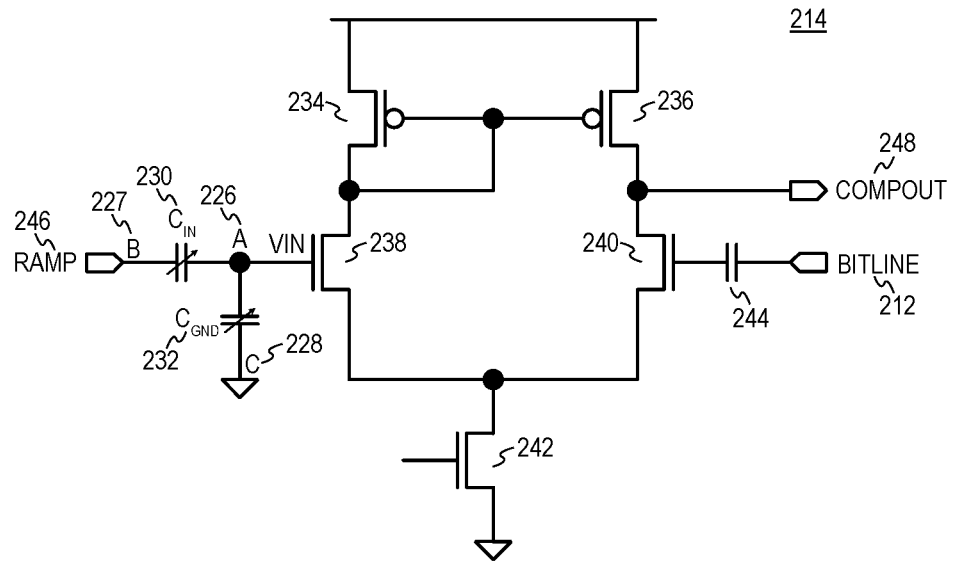
FIG. 2 illustrates one example schematic of a comparator included in an analog-to-digital conversion (ADC) circuit providing column gain with capacitor randomization in accordance with the teachings of the present disclosure.

FIG. 2 illustrates one example schematic of a comparator included in an analog-to-digital conversion (ADC) circuit 214 providing column gain with capacitor randomization in accordance with the teachings of the present disclosure. It is appreciated that the comparator of ADC circuit 214 illustrated in FIG. 2 may be an example of ADC circuit 114 included in the bitline input stage 158 of FIG. 1, and that similarly named and numbered elements described above are coupled and function similarly below.

In one example, the ADC circuit 214 is a single slope ramp type ADC circuit, which are sometimes included in CMOS image sensors to convert analog image signals to digital image signals. In various examples of ramp type ADC circuits, a comparator is used to compare the analog image signal from the bitline 212 with a reference ramp signal 246 while a counter (not shown in FIG. 2) is counting. When the analog image signal from the bitline 212 is equal to the ramp signal 246, the comparator output 248 is used to stop or sample the counter. The count value that is sampled or in the counter after the counting has stopped is used by the ADC circuit 214 to generate a digital signal that is representative of the analog image signal.

In the example depicted in FIG. 2, the example comparator includes transistors 234 and 236 coupled as a current mirror. A first input transistor 238 is coupled to transistor 234 and a second input transistor 240 is coupled to transistor 236. A tail transistor 242 is coupled to transistors 238 and 240 as shown. In the example, a gate node of transistor 240 is coupled to bitline 212 through capacitor 244 and an output COMPOUT 248 is generated at the node between transistor 236 and transistor 240.

As shown in the depicted example, a capacitor pair including a capacitor $C_{IN}$ 230 coupled to a capacitor $C_{GND}$ 232 is also shown in FIG. 2 to determine the column gain with capacitor randomization of ADC 214 in accordance with the teachings of the present disclosure. As will be discussed in further detail below, in one example, the capacitor pair provided by capacitor $C_{IN}$ 230 coupled to capacitor $C_{GND}$ 232 is representative of the capacitor ratio circuit 118 of FIG. 1. As such, the specific capacitors used to provide capacitor $C_{IN}$ 230 and capacitor $C_{GND}$ 232 are randomly selected. In the example, a first node A 226 of the capacitor pair is coupled to the gate node of transistor 238, a second node B 227 of the capacitor pair is coupled to receive the ramp signal 246, and a third node C 228 of the capacitor pair is coupled to ground. Thus, it is appreciated that the capacitance between second node B 227 and first node A 226 is $C_{IN}$ 230 and the capacitance between the first node A 226 and third node C 228 is $C_{GND}$ 232.

In one example, the capacitor pair is implemented to control or reduce the amplitude of ramp signal 246 at the input of the comparator that is coupled to be received at the gate of transistor 238. By setting the capacitor ratio provided by capacitor $C_{IN}$ 230 and capacitor $C_{GND}$ 232 of the capacitor pair, which are also coupled to ramp signal 246 and ground, the gain of ADC circuit 214 can be controlled.

It is noted that in the depicted example of FIG. 2, the capacitor pair including capacitor $C_{IN}$ 230 and capacitor $C_{GND}$ 232 is illustrated as being coupled only to the transistor 238 or ramp signal 246 side of the comparator. In another example, it is appreciated that the capacitor pair including capacitor $C_{IN}$ 230 and capacitor $C_{GND}$ 232 may be coupled to the transistor 240 or bitline 212 side of the comparator also.

In the comparator of ADC circuit 214 shown in FIG. 2, the analog gain is controlled by capacitor ratio provided by capacitor $C_{IN}$ 230 and capacitor $C_{GND}$ 232 as shown in the equation below.

$$\text{Gain} = \frac{C_{IN} + C_{GND}}{C_{IN}}$$

Therefore, according to the equation above, if a capacitor ratio of $C_{IN}:C_{GND}=8:0$ is provided by the capacitor pair, then a Gain of 1× is realized. If a capacitor ratio of $C_{IN}:C_{GND}=4:4$ is provided by the capacitor pair, then a Gain of 2× is realized. If a capacitor ratio of $C_{IN}:C_{GND}=2:6$ is provided by the capacitor pair, then a Gain of 4× is realized. If a capacitor ratio of $C_{IN}:C_{GND}=1:7$ is provided by the capacitor pair, then a Gain of 8× is realized.

Figure 3:
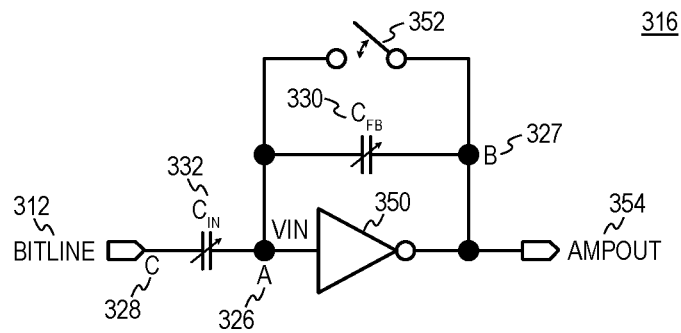
FIG. 3 illustrates one example schematic of an amplifier providing column gain with capacitor randomization in accordance with the teachings of the present disclosure.

FIG. 3 illustrates one example schematic of an amplifier 316 providing column gain with capacitor randomization in accordance with the teachings of the present disclosure. It is appreciated that the amplifier 316 illustrated in FIG. 3 may be an example of column amplifier 116 included in the bitline input stage 158 coupled between the bitlines 112 and ADC circuit 114 of FIG. 1, and that similarly named and numbered elements described above are coupled and function similarly below. In an image sensor example in which a column amplifier is included to provide analog gain, such as for example when column amplifier 116 shown in FIG. 1 is included, the gain is often controlled by capacitor ratio also. The amplifier 316 shown in FIG. 3 illustrates one example.

As shown in the depicted example, amplifier 316 includes an inverting amplifier 350 having an input coupled to receive an input voltage VIN and an output coupled to provide an output voltage AMPOUT 354. In one example, the output AMPOUT 354 is coupled to be received by an ADC circuit included in a bitline input stage of a readout circuit of an imaging system. In one example, a reset switch 352 is coupled between the input VIN and the output AMPOUT 354 of the amplifier 350. A feedback capacitor $C_{FB}$ 330 is also coupled between the input VIN and the output AMPOUT 354 of the amplifier 350. In addition, the input VIN of amplifier 350 is also coupled to bitline 312 through an input capacitor $C_{IN}$ 332.

In the depicted example, a capacitor pair is formed including capacitor $C_{IN}$ 332 coupled to capacitor $C_{FB}$ 330 as shown in FIG. 3. The gain of the amplifier 316 can be determined by the changing the capacitor ratio provided by capacitor $C_{IN}$ 332 and capacitor $C_{FB}$ 330. As will be discussed in further detail below, in one example, the capacitor pair provided by capacitor $C_{IN}$ 332 coupled to capacitor $C_{FB}$ 330 is also representative of the capacitor ratio circuit 118 of FIG. 1. As such, the specific capacitors used to provide capacitor $C_{FB}$ 330 and capacitor $C_{IN}$ 232 are randomly selected. In the example, a first node A 326 of the capacitor pair is coupled to the input VIN of amplifier 350, a second node B 327 of the capacitor pair is coupled to the output AMPOUT 354 of the amplifier 350, and a third node C 328 of the capacitor pair is coupled to the bitline 312. Thus, it is appreciated that the capacitance between second node B 327 and first node A 326 is $C_{FB}$ 330 and the capacitance between the first node A 326 and third node C 328 is $C_{IN}$ 332.

In the amplifier 316 shown in FIG. 3, the gain is controlled by the capacitor ratio of capacitor $C_{IN}$ 332 and capacitor $C_{FB}$ 330 according to the equation below.

$$\text{Gain} = \frac{C_{IN}}{C_{FB}}$$

Therefore, according to the equation above, if a capacitor ratio of $C_{IN}:C_{FB}=4:4$ is provided by the capacitor pair, then a Gain of 1× is realized. If a capacitor ratio of $C_{IN}:C_{FB}=5:3$ is provided by the capacitor pair, then a Gain of 1.67× is realized. If a capacitor ratio of $C_{IN}:C_{FB}=6:2$ is provided by the capacitor pair, then a Gain of 3× is realized. If a capacitor ratio of $C_{IN}:C_{FB}=7:1$ is provided by the capacitor pair, then a Gain of 7× is realized.

Figure 4:
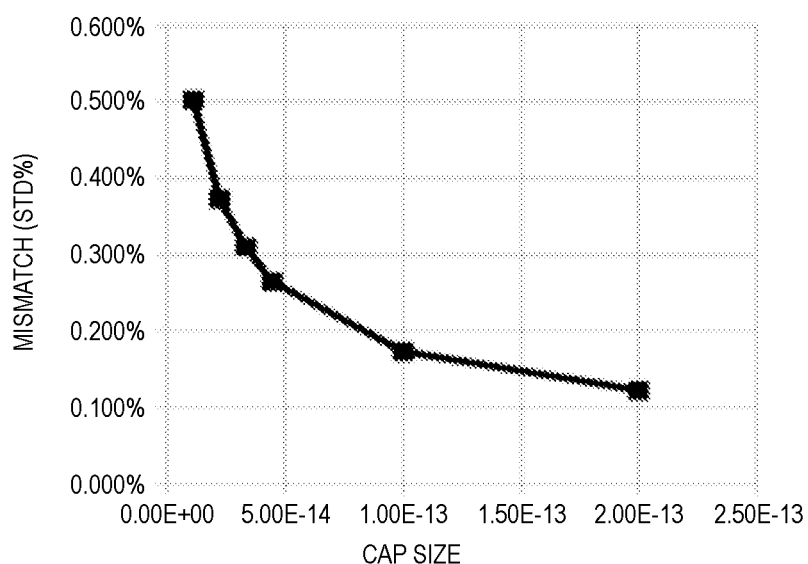
FIG. 4 is diagram that illustrates an example of the relationship between capacitance mismatch versus capacitor size.

In the examples illustrated in both FIG. 2 and FIG. 3, a mismatch in the capacitors of the capacitor pair results in high light vertical fixed pattern noise (VFPN) under bright conditions because gain is determined by the capacitor ratio as discussed above. A mismatch in the capacitors of the capacitor pair can be reduced by increasing the size of the capacitors at the expense of area and speed. To illustrate, FIG. 4 is diagram that shows an example of the relationship between capacitance mismatch versus capacitor size. As shown, as capacitor size decreases along the x-axis of FIG. 4, the undesirable effects capacitor mismatch increase dramatically. Consequently, it is noted that capacitors are often the largest components in column circuits, which in some instances may account for 10~20% of bitline capacitance of an image sensor design. However, it is also desired to reduce the size of capacitors to lower the overall cost per unit area and increase the frame rate.

Figure 5:
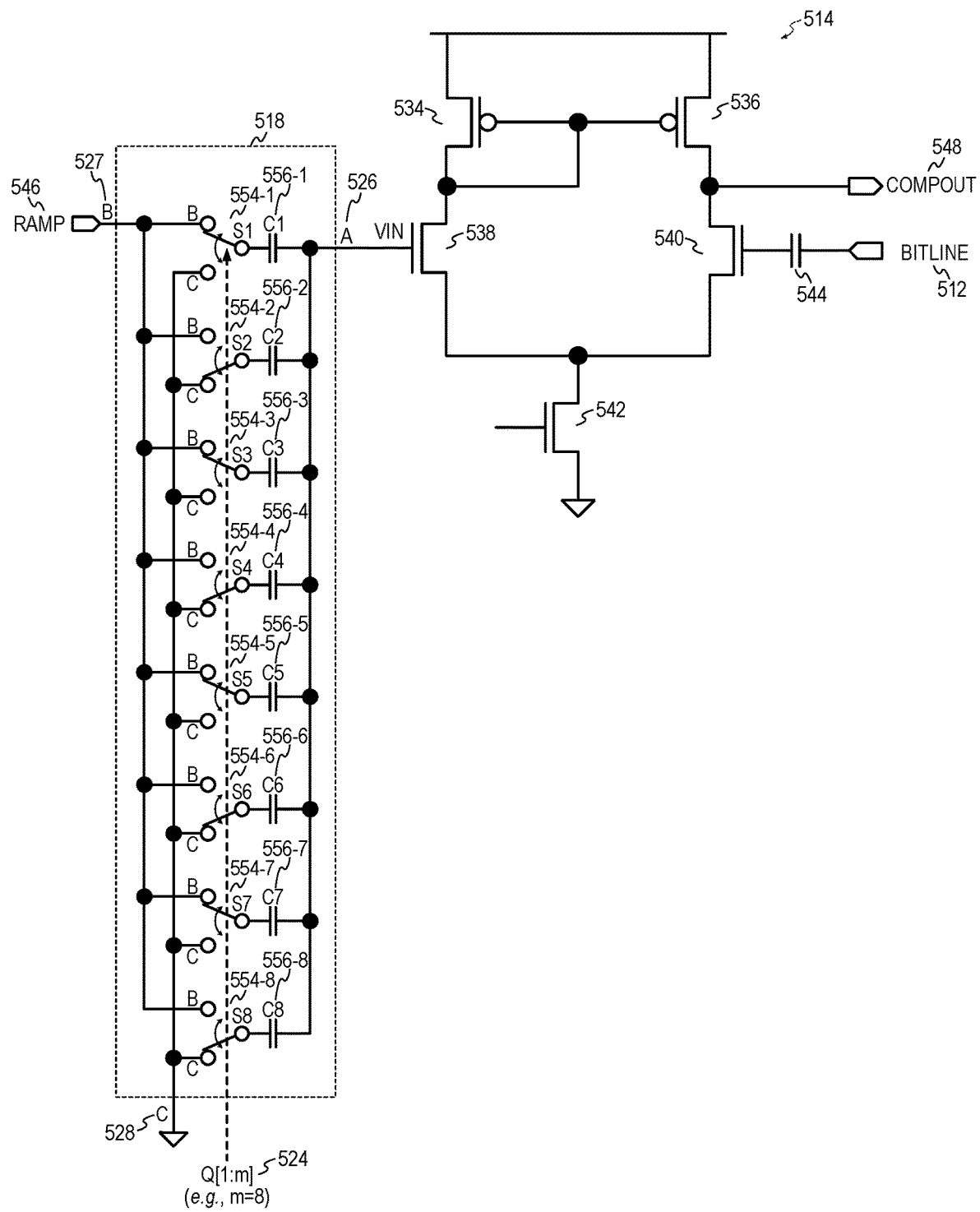
FIG. 5 illustrates another example schematic of a capacitor ratio circuit coupled to an example comparator included in an ADC circuit providing column gain with capacitor randomization in accordance with the teachings of the present disclosure.

FIG. 5 illustrates an example schematic of a portion of a readout circuit 506 including a capacitor ratio circuit 518 coupled to an example comparator included in an ADC circuit 514 providing column gain with capacitor randomization in accordance with the teachings of the present disclosure. It is appreciated that the capacitor ratio circuit 518 of FIG. 5 may be an example of the capacitor ratio circuit formed with capacitors $C_{IN}$ 230 and $C_{GND}$ 232 coupled to the comparator of ADC circuit 214 illustrated in FIG. 2, or an example of the capacitor ratio circuit 118 of FIG. 1, and that similarly named and numbered elements described above are coupled and function similarly below.

It is appreciated that the example comparator included in ADC circuit 514 of FIG. 5 shares many similarities with the example comparator included in ADC circuit 214 of FIG. 2. For instance, the example comparator shown in FIG. 5 includes transistors 534 and 536 coupled as a current mirror. A first input transistor 538 is coupled to transistor 534 and a second input transistor 540 is coupled to transistor 536. A tail transistor 542 is coupled to transistors 538 and 540 as shown. In the example, a gate node of transistor 540 is coupled to bitline 512 through capacitor 544 and an output COMPOUT 548 is generated at the node between transistor 536 and transistor 540.

The example illustrated in FIG. 5 also illustrates capacitor ratio circuit 518 including a first node A 526 coupled to the input VIN coupled to the gate node of transistor 538, a second node B 527 coupled to receive the ramp signal 546, and a third node C 528 coupled to ground. As shown, capacitor ratio circuit 518 includes a plurality of capacitors C1 556-1 to C8 556-8 coupled to the first node A 526. In the illustrated example, capacitor ratio circuit 518 includes a total number of m capacitors. In the example, m is equal to 8 for explanation purposes. It is appreciated that in other examples, m may be a different number. In the example, each one of the plurality of capacitors C1 556-1 to C8 556-8 has capacitance value equal to a small unit capacitance.

Continuing with the example shown in FIG. 5, capacitor ratio circuit 518 also includes a plurality of switches S1 554-1 to S8 554-8. In the illustrated example, capacitor ratio circuit 518 includes a total number of m switches. Each one of the plurality of switches S1 554-1 to S8 554-8 is coupled to a respective one of the plurality of capacitors C1 556-1 to C8 556-8. In operation, each one of the plurality of switches S1 554-1 to S8 554-8 is configured to independently couple the respective one of the plurality of capacitors C1 556-1 to C8 556-8 to either the second node B 527 or the third node C 528 of the capacitor ratio circuit 518 in response to a randomized pattern selection signal Q[1:8] 524, which as will be described in further detail below is generated by a switch control circuit.

Therefore, it is appreciated that the plurality of capacitors C1 556-1 to C8 556-8 can be separated into a first subset of capacitors and a second subset of capacitors. The first subset of capacitors are the capacitors that are coupled to the second node B 527, and the second subset of capacitors are coupled to the third node C 528 in response to the randomized pattern selection signal Q[1:8] 524.

The number of capacitors coupled to second node B 527 included in the first subset of capacitors is equal to B, the number of capacitors included in the second subset of capacitors coupled to third node 528 is equal to C, and m is the total number of capacitors in the capacitor ratio circuit 518. Thus, $$B+C=m$$

As such, it is appreciated that the plurality of switches S1 554-1 to S8 554-8 can also be separated into a first subset of switches and a second subset of switches. The first subset of switches are the switches that are set to be coupled to the second node B 527, and the second subset of switches are set to be coupled to the third node C 528 in response to the randomized pattern selection signal Q[1:8] 524.

Once the plurality of switches S1 554-1 to S8 554-8 are set in response to the randomized pattern selection signal Q[1:8] 524, the capacitance ratio provided by the capacitance ratio circuit 518 is responsive to the total capacitance provided by the B capacitors of the first subset of capacitors coupled between the second node B 527 and the first node A 526 and the total capacitance provided by the C capacitors of the second subset of capacitors coupled between the first node A 526 and the third node C 528. It is appreciated of course the total capacitance $C_{TOT}$ of capacitors coupled in parallel is equal to sum of the capacitances of each capacitor, or $$C_{TOT}=C1+C2+C3+\ldots$$

where capacitors C1, C2, C3, . . . are coupled in parallel. In the depicted example, the specific capacitors that are included in the B capacitors of the first subset of capacitors and specific capacitors that are included in the C capacitors of the second subset of capacitors are randomly determined in response to the randomized pattern selection signal Q[1:8] 524.

In particular, the capacitors utilized to control analog gain are divided among small unit capacitors and the specific connections of those unit capacitors are changed randomly row by row in response to the randomized pattern selection signal Q[1:8] 524 in accordance with the teachings of the present invention. As will be discussed, the randomized pattern selection signal Q[1:8] 524 is re-determined or re-generated between each row readout of the pixel array. In other words, the randomized pattern selection signal Q[1:8] 524 is updated between each row readout of the pixel array, even if the gain remains constant for each row readout. Thus, the total number of unit capacitors that are connected to either the ramp signal 546 and ground 528 remains constant for each successive row readout so that the gain is the same or constant for each row readout. However, the specific capacitors that are coupled to ramp signal 546 and ground 528 are switched randomly between each row readout. The probability that each capacitor is connected to the ramp signal 546 or ground 528 is same for each row readout. For example, assuming that there are a total of m=8 capacitors included in capacitor ratio circuit 518, the probability that a particular capacitor is connected to ramp signal 546 is 50% for each row readout at 2× gain, or 12.5% at 8× gain, and so on.

In this way, it is appreciated that the VFPN for bright lighting conditions can be reduced. Typically, VFPN for bright or high light conditions is mainly caused by the gain error of the capacitor pair resulting from capacitor mismatch. To illustrate, assuming that a capacitor pair comprises "n" number of unit capacitors and that one of the capacitors is defective and has a capacitance error of ΔC, the gain of the ADC circuit can be determined by the following equations:

$$\text{Gain}_{in} = \frac{(n_{in}+n_{gnd}) \cdot C + \Delta C}{n_{in} \cdot C + \Delta C}$$

$$\text{Gain}_{gnd} = \frac{(n_{in}+n_{gnd}) \cdot C + \Delta C}{n_{in} \cdot C}$$

where $\text{Gain}_{in}$ is the gain if the defective capacitor is connected to ramp signal, $\text{Gain}_{gnd}$ is the gain if the defective capacitor is connected to ground, C is unit capacitor size, nu, is number of unit capacitors connected to the ramp signal, and $n_{gnd}$ a is number of unit capacitors connected to ground. Then the vertical average of gain $\text{Gain}_{vavg}$, which affects the VFPN when the output signal from pixel array is uniform can be described as shown in the equation below:

$$\text{Gain}_{vavg} = \frac{n_{in}}{n_{in}+n_{gnd}} \cdot \text{Gain}_{in} + \frac{n_{gnd}}{n_{in}+n_{gnd}} \cdot \text{Gain}_{gnd}$$

where the first term in the equation above is representative of when the defective capacitor is connected to the ramp signal and the second term in the equation above is representative of when the defective capacitor is connected to ground. As such:

$$\text{Gain}_{vavg} = \frac{n_{in}+n_{gnd}}{n_{in}} \cdot \left\{ 1 + \frac{1}{(n_{in}+n_{gnd})^2} \cdot \left( \frac{\frac{n_{gnd}}{n_{in}} \cdot \Delta C^2}{C \cdot \left(C + \frac{\Delta C}{n_{in}}\right)} \right) \right\}$$

$$Gain_{vavg} \approx \frac{n_{in} + n_{gnd}}{n_{in}} \cdot \left\{ 1 + \frac{n_{gnd}}{n_{in} \cdot (n_{in} + n_{gnd})^2} \cdot \left(\frac{\Delta C}{C}\right)^2 \right\}, \Delta C \ll C$$

where ideal gain is represented by the first term in the equation above, gain error is represented by the term added to one between the brackets in the equation above, and where ΔC is significantly less than C. Accordingly, the gain error is therefore proportional to $(\Delta C/C)^2$. Without column gain, the connection randomization, it is proportional to (ΔC/C). Typically in a column circuit, ΔC is smaller than 1% of C and so the VFPN can be reduced significantly by randomization in accordance with the teachings of the present invention.

Thus, if we assume that one of the capacitors, e.g., capacitor C1 556-1 of FIG. 5 is defective, and the error of C1 is +0.2%, the gain error is −0.175% when capacitor C1 556-1 is connected to ramp signal 546 and is 0.025% when capacitor C1 556-1 is connected to ground 528. Further, since m=8 in the example of FIG. 5, capacitor C1 556-1 is connected to ramp signal 546 once every eight row readouts on average since the pattern selection signal Q[1:8] 524 is changed randomly row by row between each successive row readout. Thus, the VFPN can be very small, such as less than 0.001% in this example in accordance with the teachings of the present invention.

Figure 6:
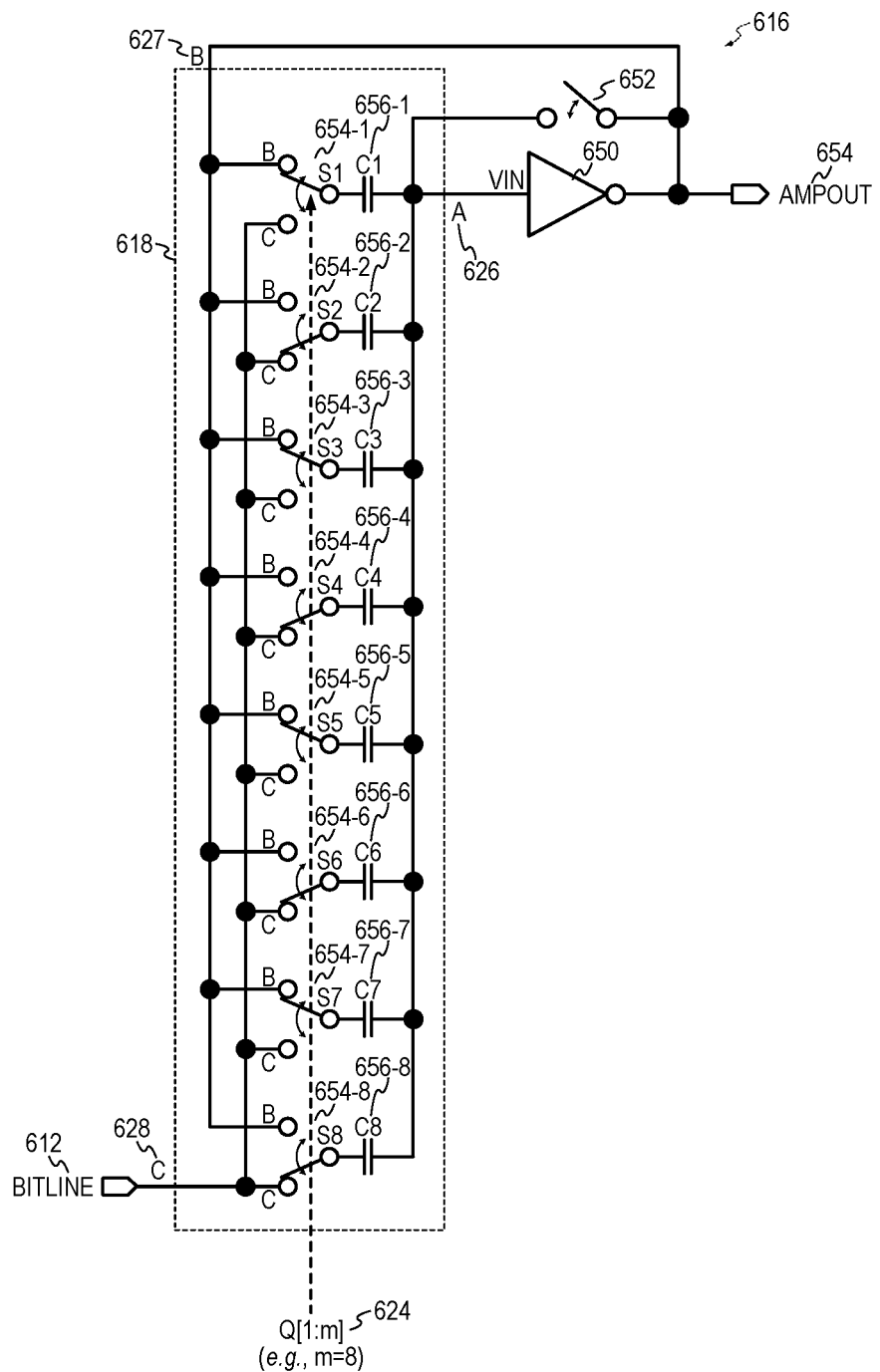
FIG. 6 illustrates another example schematic a capacitor ratio circuit coupled to an amplifier providing column gain with capacitor randomization in accordance with the teachings of the present disclosure.

It is appreciated that reducing VFPN can also be realized by randomly changing the pattern selection signal Q[1:8] 524 row by row between each successive row readout for an example column amplifier. To illustrate, FIG. 6 illustrates an example schematic of a portion of a readout circuit 606 including a capacitor ratio circuit 618 coupled to an amplifier 616 providing column gain with capacitor randomization in accordance with the teachings of the present disclosure. It is appreciated that the capacitor ratio circuit 618 of FIG. 6 may be an example of the capacitor ratio circuit formed with capacitors $C_{FB}$ 330 and $C_{IN}$ 332 included in amplifier 316 illustrated in FIG. 3, or an example of the capacitor ratio circuit 118 of FIG. 1, and that similarly named and numbered elements described above are coupled and function similarly below.

It is appreciated that the amplifier 616 of FIG. 6 shares many similarities with the example amplifier 316 of FIG. 3. For instance, the example amplifier 616 shown in FIG. 6 includes an inverting amplifier 650 having an input coupled to receive an input voltage VIN and an output coupled to provide an output voltage AMPOUT 654. In one example, the output AMPOUT 654 is coupled to be received by an ADC circuit included in a bitline input stage of the readout circuit 606 of an imaging system. In one example, a reset switch 652 is coupled between the input VIN and the output AMPOUT 654 of the amplifier 650.

The example illustrated in FIG. 6 also illustrates that a capacitor pair is provided with capacitor ratio circuit 618. It is appreciated that the example capacitor ratio circuit 618 of FIG. 6 shares many similarities with the example capacitor ratio circuit 518 of FIG. 5. For instance, capacitor ratio circuit 618 of FIG. 6 includes a first node A 626 coupled to the input VIN of the amplifier 650, a second node B 627 coupled to the output AMPOUT 654 of the amplifier 650, and a third node C 528 coupled to the bitline 612. As shown, capacitor ratio circuit 618 includes a plurality of capacitors C1 656-1 to C8 656-8 coupled to the first node A 626. In the illustrated example, capacitor ratio circuit 618 includes a total number of m capacitors. In the example, m is equal to 8 for explanation purposes. It is appreciated that in other examples, m may be a different number. In the example, each one of the plurality of capacitors C1 656-1 to C8 656-8 has capacitance value equal to a small unit capacitance.

Continuing with the example shown in FIG. 6, capacitor ratio circuit 618 also includes a plurality of switches S1 654-1 to S8 654-8. In the illustrated example, capacitor ratio circuit 618 includes a total number of m switches. Each one of the plurality of switches S1 654-1 to S8 654-8 is coupled to a respective one of the plurality of capacitors C1 656-1 to C8 656-8. In operation, each one of the plurality of switches S1 654-1 to S8 654-8 is configured to independently couple the respective one of the plurality of capacitors C1 656-1 to C8 656-8 to either the second node B 627 or the third node C 628 of the capacitor ratio circuit 618 in response to a randomized pattern selection signal Q[1:8] 624, which as will be described in further detail below is generated by a switch control circuit.

Therefore, it is appreciated that the plurality of capacitors C1 656-1 to C8 656-8 can be separated into a first subset of capacitors and a second subset of capacitors. The first subset of capacitors are the capacitors that are coupled to the second node B 627, and the second subset of capacitors are coupled to the third node C 628 in response to the randomized pattern selection signal Q[1:8] 624.

As discussed above with respect to the example shown in FIG. 5, the gain of amplifier 616 of FIG. 6 can also be set or adjusted by with the capacitor ratio provided by capacitor ratio circuit 618, and the VFPN can be reduced by randomly switching the specific capacitors that are coupled to second node B 627 and third node C 628 between each row readout of the pixel array. For instance, the capacitors utilized to control gain are divided among small unit capacitors and the specific connections of those unit capacitors are switched randomly for every successive row readout period of the pixel array in response to the randomized pattern selection signal Q[1:8] 624 in accordance with the teachings of the present invention. However, the number of unit capacitors that are connected to amplifier output AMPOUT 654 and to bitline 612 remain the same for each row readout for the same or fixed gain, and the probability that each specific capacitor is connected to either AMPOUT 654 or bitline 612 is the same. For example, the probability that one of the capacitors is connected to bitline 612 signal is 50% at 1× gain and 87.5% at 7× gain.

Thus, similar to the example described above in FIG. 5, it is appreciated that the VFPN for bright lighting conditions can also be reduced for example amplifier 616 as shown in FIG. 6. As mentioned, VFPN for bright or high lighting conditions is mainly caused by the gain error of the capacitor pair resulting from capacitor mismatch. To illustrate, assuming that a capacitor pair comprises "n" number of unit capacitors and that one of the capacitors is defective and has a capacitance error of ΔC, the gain of the ADC circuit can be determined by the following equations:

$$Gain_{fb} = \frac{n_{in} \cdot C}{n_{fb} \cdot C + \Delta C}$$

$$Gain_{in} = \frac{n_{in} \cdot C + \Delta C}{n_{fb} \cdot C}$$

where $Gain_{fb}$ is the gain if the defective capacitor is connected to the output AMPOUT 654, Gain is the gain if the defective capacitor is connected to bitline 612, C is unit capacitor size, $n_{fb}$ is number of unit capacitors connected to the output AMPOUT 654, and nm is number of unit capacitors connected to bitline 612. Then the vertical average of gain Gain$_{vavg}$, which affects the VFPN when the output signal from pixel array is uniform and can be described as shown in the equation below:

$$\text{Gain}_{vavg} = \frac{n_{fb}}{n_{fb}+n_{in}} \cdot \text{Gain}_{fb} + \frac{n_{in}}{n_{fb}+n_{in}} \cdot \text{Gain}_{in}$$

where the first term in the equation above is representative of when the defective capacitor is connected to the output AMPOUT 654 and the second term in the equation above is representative of when the defective capacitor is connected to bitline 612. As such:

$$\text{Gain}_{vavg} = \frac{n_{in}}{n_{fb}} \cdot \left\{ 1 + \frac{1}{n_{fb}+n_{in}} \cdot \left( \frac{\frac{\Delta C^2}{n_{fb}}}{C \cdot \left(C + \frac{\Delta C}{n_{fb}}\right)} \right) \right\}$$

$$\text{Gain}_{vavg} \approx \frac{n_{in}}{n_{fb}} \cdot \left\{ 1 + \frac{1}{n_{fb} \cdot (n_{fb}+n_{in})} \cdot \left(\frac{\Delta C}{C}\right)^2 \right\}, \Delta C \ll C$$

where ideal gain is represented by the first term in the equation above, gain error is represented by the term added to one between the brackets in the equation above, and $\Delta C$ is significantly less than C. Accordingly, the gain error is therefore proportional to $(\Delta C/C)^2$. Without column gain, the connection randomization, it is proportional to $(\Delta C/C)$. Typically in a column circuit, $\Delta C$ is smaller than 1% of C and so that VFPN can be reduced significantly by randomization in accordance with the teachings of the present invention.

Figure 7:
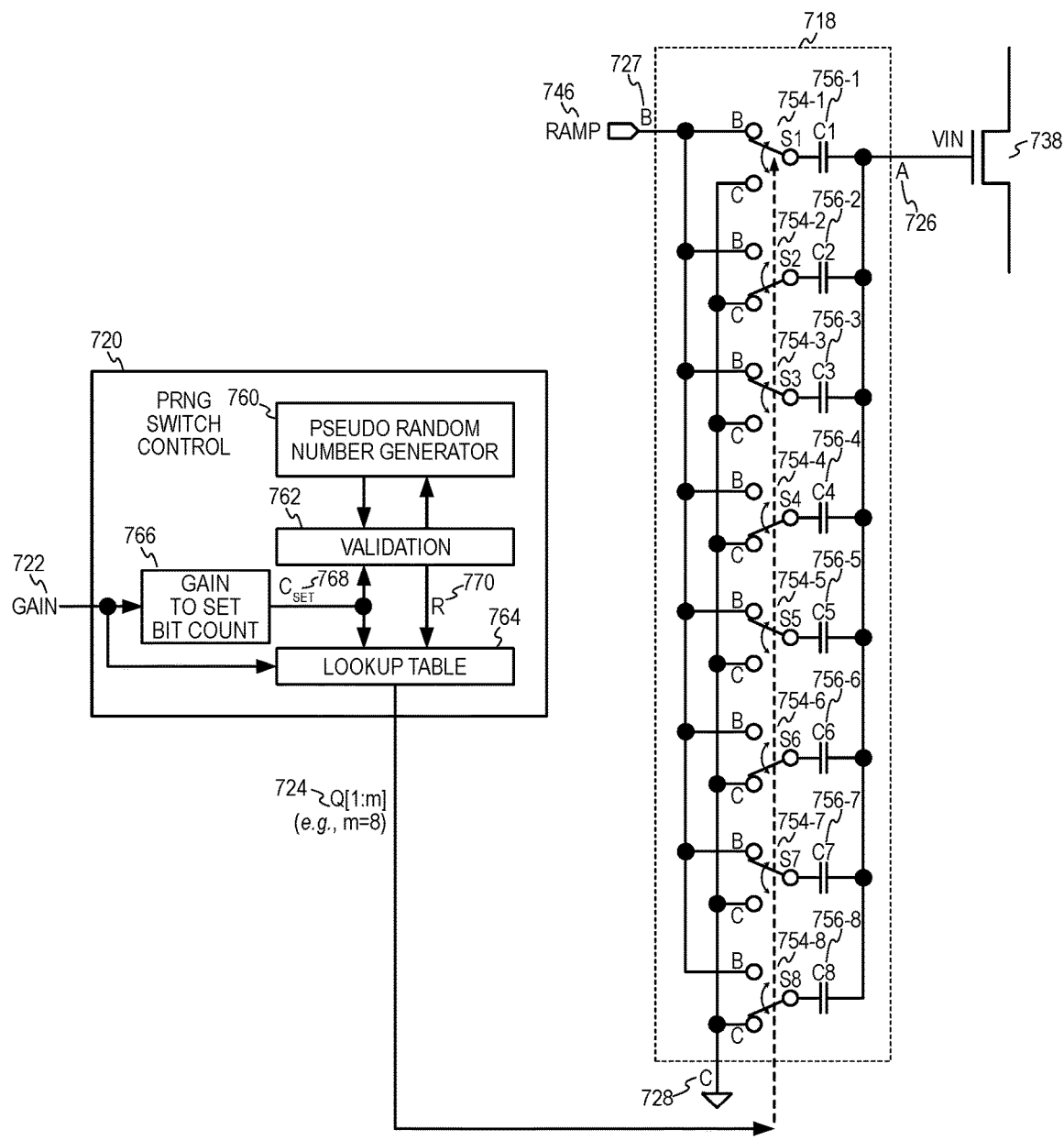
FIG. 7 illustrates an example schematic of a switch control circuit coupled to an example capacitor ratio circuit coupled to a comparator included in an ADC circuit providing column gain with capacitor randomization in accordance with the teachings of the present disclosure.

FIG. 7 illustrates an example schematic of a portion of a readout circuit 706 including an example switch control circuit 720 coupled to an example capacitor ratio circuit 718 that is coupled to a comparator included in an ADC circuit providing column gain with capacitor randomization in accordance with the teachings of the present disclosure. It is appreciated that switch control circuit 720 of FIG. 7 may be an example of switch control circuit 120 of FIG. 1. It is further appreciated that the randomized pattern selection signal Q[1:8] 724 generated by switch control circuit 720 and received by the capacitor ratio circuit 718 of FIG. 7 may be examples of the randomized pattern selection signal Q[1:8] 524 received by capacitor ratio circuit 518 of FIG. 5, and that similarly named and numbered elements described above are coupled and function similarly below.

In the example illustrated in FIG. 7, a first input transistor 738 of a comparator of an ADC circuit is illustrated. The capacitor ratio circuit 718 includes a first node A 726 coupled to the gate input VIN of first input transistor 738. The capacitor ratio circuit 718 also includes a second node B 727 coupled to receive a ramp signal 746 and a third node C 728 coupled to ground. Similar to the capacitor ratio circuit 518 of FIG. 5, capacitor ratio circuit 718 of FIG. 7 also includes a plurality of capacitors C1 756-1 to C8 756-8 coupled to the first node A 726. In the illustrated example, capacitor ratio circuit 718 includes a total number of m capacitors. In the example, m is equal to 8 for explanation purposes. It is appreciated that in other examples, m may be a different number. In the example, each one of the plurality of capacitors C1 756-1 to C8 756-8 has capacitance value equal to a small unit capacitance.

Continuing with the example shown in FIG. 7, capacitor ratio circuit 718 also includes a plurality of switches S1 754-1 to S8 754-8. In the illustrated example, capacitor ratio circuit 718 includes a total number of m switches. Each one of the plurality of switches S1 754-1 to S8 754-8 is coupled to a respective one of the plurality of capacitors C1 756-1 to C8 756-8. In operation, each one of the plurality of switches S1 754-1 to S8 754-8 is configured to independently couple the respective one of the plurality of capacitors C1 756-1 to C8 756-8 to either the second node B 727 or the third node C 728 of the capacitor ratio circuit 718 in response to the randomized pattern selection signal Q[1:8] 724, which is coupled to be received from the switch control circuit 720. In operation, the switch control circuit 720 is configured to randomly generate the pattern of bits that are set in the pattern selection signal Q[1:8] 724 for each row readout of the pixel array in response to gain signal 722 to control the gain of the bitline input stage (e.g., 158) of the readout circuit (e.g., 106) as described above.

As shown in the depicted example, switch control circuit 720 includes a pseudorandom number generator 760 coupled to generate a pseudorandom number. The switch control circuit 720 is coupled to generate the randomized pattern selection signal Q[1:8] 724 in response to the pseudorandom number generated by the pseudorandom number generator 760 and the gain signal 722. In the illustrated example, the switch control circuit 720 further includes a gain to set bit count generator 766, which is coupled to receive the gain signal 722 to generate a set bit count $C_{SET}$ 768 in response to the gain signal 722. A validation block 762 is coupled to the pseudorandom number generator 760 and to gain to set bit count generator 766. The validation block 762 is coupled to control the pseudorandom number generator 760 to generate a valid pseudorandom number R 770 in response to the set bit count $C_{SET}$ 768 received from the gain to set bit count generator 766. A lookup table 764 is coupled to the validation block 762 and the gain to set bit count generator 766 to generate the randomized pattern selection signal Q[1:8] 724 in response the valid pseudorandom number R 770, the set bit count $C_{SET}$ 768, and the gain signal 722.

In order switch control circuit 720 to generate the randomized pattern selection signal Q[1:8] 724, it is appreciated that the various patterns of bits (e.g., pattern of "1's" and "0's") included in the randomized pattern selection signal Q[1:8] 724 include a fixed number or fixed count of bits that are set, which may be represented by set bit count $C_{SET}$ 768. In one example, the bits that are set (e.g., "1") in the randomized pattern selection signal Q[1:8] 724 may be utilized to have the respective switch be coupled to the second node B 727 while the bits that are cleared (e.g., "0") may be utilized to have the respective switch be coupled to the third node C 728. In another example, it is appreciated that the polarity of the logic may be reversed. The count represented by the set bit count $C_{SET}$ 768 may be dependent on the traditional analog gain, which can be varied dynamically in one example. Further, the number of set bits (e.g., "1's") may need to be spread randomly across the randomized pattern selection signal Q[1:8] 724 from row to row throughout a gain input of a fixed number of bits.

To illustrate, the number of patterns $N_{PAT}$ can be represented by the equation below:

$$N_{PAT} = \frac{(C_{SET}+C_{CLR})!}{C_{SET}! \cdot C_{CLR}!}$$

where $C_{SET}$ is the number of set bits (e.g., "1's") and $C_{CLR}$ is the number of cleared bits (e.g., "0's"). The width of the gain input is $C_{SET}+C_{CLR}$, which in the example is equal to m, or the total number of the plurality of switches S1 754-1 to S8 754-8 in the capacitor ratio circuit 718. In other examples, it is appreciated that $N_{PAT}$ may not necessarily limited to being equal to a power of 2.

In one example, the pseudo random number generator 760 is used to generate a random number with a long repeat period, which can optionally be disabled or re-seeded (e.g., providing the same sequence), or manipulated in any number of ways. If the output of the pseudo random number generator 760 is an invalid number that is greater than the gain-dependent maximum value $N_{PAT}$, then validation block 762 causes pseudo random number generator 760 to re-generate another random number or change the random number until the re-generated random number is a valid pseudorandom number R 770 that is within a valid range. The valid pseudorandom number R 770 is passed through logic, such as for example, the lookup table 764, which is coupled generate the output gain value, or randomized pattern selection signal Q[1:8] 724. Each entry of the lookup table 764 will map the valid pseudorandom number R 770 to the gain signal 722 with a different pattern according to set bit count $C_{SET}$ 768, where the number of set bits that are set according to set bit count $C_{SET}$ 768 is dependent on the input gain as indicated with the gain signal 722.

In various examples, there are some instances in which image quality can be improved by limiting the different possible random patterns that can be generated by switch control circuit 720 in randomized pattern selection signal Q[1:8] 724. Two examples of such limitations can be utilized to address the problems associated with capacitor variation having a trend or pattern based on location in an array as well as problems associated with the kickback that may occur when switching capacitors.

To illustrate, in one example the plurality of capacitors C1 756-1 to C8 756-8 in capacitor ratio circuit 718 are arranged in an array of capacitors. For instance, as shown in the example depicted in FIG. 7, the plurality of capacitors C1 756-1 to C8 756-8 is arranged as a 1×m array, where m=8. In one example, the variations across the array of capacitors may exhibit non-random variation based on location in the array. For example, even though each of the plurality of capacitors C1 756-1 to C8 756-8 is supposed to have the same small unit capacitance, the capacitance may be smaller in bottom side (e.g., C8 756-8) of capacitor array and larger on top side (e.g., C1 756-1), or vice versa. This kind of variation in capacitance according to the location of a capacitor in the capacitor array can be reduced with a common centroid layout in which the capacitors connected to ramp signal 746 at second node B 727 and ground at third node C 728 are symmetrically located across the center of the array.

In other words, this non-random variation pattern can be cancelled by selecting capacitors symmetrically with respect to a center of the array of capacitors, like common centroid. To achieve this, in one example it is assumed that the plurality of capacitors includes an even number of capacitors, such as for example m=8. For instance, in the example depicted in FIG. 7, the location of the center of the array of capacitors is located between capacitor C4 756-4 and capacitor C5 756-5. Thus, the number of capacitors "above" and "below" the center of the array is equal to m/2, or 4 in the example depicted in FIG. 7.

In this example, the switch control circuit 720 is coupled to generate only randomized pattern selection signals Q[1:8] 724 such that the switches S1 754-1 to S4 754-4 that are "above" the center of the array are always switched symmetrically across the center of the array with switches S5 754-5 to S8 754-8 that are "below" the center of the array. To state in another way, assuming the total number of capacitors is equal to an even number m and the capacitors are numbered C[0] to C[m−1], then capacitor C[n] and capacitor C[m−1−n] are always coupled to the same nodes, where n=0 to m−1. Thus, in an example in which the capacitor ratio circuit 718 includes m=8 unit capacitors, capacitor C[0] and capacitor C[7] are always connected to same nodes. Also capacitors C[1] and C[6], C[2] and C[5], and C[3] and C[4] are always coupled to the same nodes (e.g., the second node B 727 or the third node C 728) of the capacitor ratio circuit 718. In this way, the capacitance variation based on location from the bottom to the top of the array of capacitors can be cancelled in accordance with the teachings of the present invention.

As mentioned, in another example, it is appreciated that there may sometimes be problems associated with the kickback that may occur when switching capacitors in the capacitor ratio circuit 718. In order to address this problem, capacitors in the capacitor ratio circuit 718 are switched in a way to make the effects of kickback constant. To illustrate, when capacitor connections are switched, there is an alternating current (AC) current to the voltage supply (e.g., $V_{RAMP}$) and ground in the case of a column gain ADC circuit example, or to the bitline and ground in the case of a column amplifier example. This AC current depends on number of capacitors that are switched in the capacitor ratio circuit 718. The AC current caused by the kickback may result in unwanted noise in the acquired image. This noise may be especially noticeable when kickback varies from row to row, which may therefore result in unwanted horizontal random noise (HRN).

In one example, this kickback problem is addressed by limiting the maximum number of capacitors that can be switched between each successive row readout of the pixel array. By limiting the maximum number of capacitors that can be switched, the maximum AC current can be limited resulting from kickback is limited. This limiting of the maximum number of capacitors that are switched can be achieved in several ways.

In one example, the switch control circuit 720 is coupled to generate the randomized pattern selection signal Q[1:8] 724 such that up to a maximum number of the specific capacitors that are included in the B capacitors of the first subset of capacitors and the specific capacitors that are included in the C capacitors of the second subset of capacitors are allowed to change states between each successive row readout of the pixel array. For instance, in one example, the maximum number is less than the number of the plurality of capacitors, m. Thus, in one example, m=8, and a maximum number of only up to 4 capacitors are allowed to change states (e.g., change from "node B to node C" or change from "node C to node B") between successive row readouts. In other examples, the maximum number may be a different number than 4 or m/2.

In another example, the switch control circuit 720 is coupled to generate the randomized pattern selection signal Q[1:8] 724 such that a fixed number of the specific capacitors that are included in the B capacitors of the first subset of capacitors and the specific capacitors that are included in the C capacitors of the second subset of capacitors are allowed to change states between each successive row readout of the pixel array. For instance, in one example, m=8 and a fixed number of 4 capacitors change states (e.g., from "node B to node C" or from "node C to node B") between successive row readouts. In other words, the same fixed number (e.g., 4) of capacitors change states between each successive row readout. In this way, the AC current resulting from kickback can be constant for each successive row readout so that the noise in the acquired images becomes uniform and is therefore more difficult to discern.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A pixel cell readout circuit, comprising:
   a bitline input stage coupled to a bitline to receive an image signal from a pixel cell;
   a capacitor ratio circuit coupled to the bitline input stage, wherein a gain of the bitline input stage is responsive to a capacitor ratio provided by the capacitor ratio circuit to the bitline input stage, wherein the capacitor ratio circuit comprises:
      a plurality of capacitors coupled to a first node of the capacitor ratio circuit that is coupled to an input of the bitline input stage, wherein a number of the plurality of capacitors is equal to m; and
      a plurality of switches, wherein each one of the plurality of switches is coupled to a respective one of the plurality of capacitors, wherein each one of the plurality of switches is configured to independently couple the respective one of the plurality of capacitors to either a second node or a third node of the capacitor ratio circuit in response to the randomized pattern selection signal from a switch control circuit; and
   the switch control circuit coupled to receive a gain signal, wherein the switch control circuit is coupled to generate the randomized pattern selection signal coupled to be received by the capacitor ratio circuit to select the capacitor ratio provided by the capacitor ratio circuit in response to the gain signal.

2. The pixel cell readout circuit of claim 1, wherein the plurality of capacitors comprises a first subset of capacitors and a second subset of capacitors, wherein a number of the first subset capacitors is equal to B, a number of the second subset of capacitors is equal to C, and a sum of B and C is equal to m,
   wherein the plurality of switches comprises a first subset of switches and a second subset of switches, wherein a number of the first subset of switches is equal to B, and a number of the second subset of switches is equal to C,
   wherein the first subset of capacitors is coupled to the first node through first subset of switches and the second subset of capacitors is coupled to the second node through second subset of switches in response to the randomized pattern selection signal from the switch control circuit.

3. The pixel cell readout circuit of claim 2, wherein the capacitance ratio provided by the capacitance ratio circuit is responsive to a total capacitance provided by the B capacitors of the first subset of capacitors coupled between the second node and the first node and a total capacitance provided by the C capacitors of the second subset of capacitors coupled between the first node and the third node.

4. The pixel cell readout circuit of claim 2, wherein specific capacitors that are included in the B capacitors of the first subset of capacitors and specific capacitors that are included in the C capacitors of the second subset of capacitors are determined in response to the randomized pattern selection signal from the switch control circuit.

5. The pixel cell readout circuit of claim 4, wherein the switch control circuit comprises a pseudorandom number generator coupled to generate a pseudorandom number, wherein the switch control circuit is coupled to generate the randomized pattern selection signal in response to the pseudorandom number and the gain signal.

6. The pixel cell readout circuit of claim 5, wherein the switch control circuit further comprises:
   a gain to set bit count generator coupled to receive the gain signal to generate a set bit count in response to the gain signal;
   a validation block coupled to the pseudorandom number generator and the gain to set bit count generator, wherein the validation block is coupled to control the pseudorandom number generator to generate a valid pseudorandom number in response to the set bit count received from the gain to set bit count generator; and
   a lookup table coupled to the validation block and the gain to set bit count generator to generate the randomized pattern selection signal in response the valid pseudorandom number, the set bit count, and the gain signal.

7. The pixel cell readout circuit of claim 5, wherein the plurality of capacitors in the capacitor ratio circuit are arranged in an array of capacitors.

8. The pixel cell readout circuity of claim 7, wherein locations in the array of capacitors of the specific capacitors that are included in the B capacitors of the first subset of capacitors and locations in the array of capacitors of the specific capacitors that are included in the C capacitors of the second subset of capacitors are symmetrically located with respect to a center of the array of capacitors.

9. The pixel cell readout circuit of claim 8, wherein the number of the plurality of capacitors, m, is equal to an even number.

10. The pixel cell readout circuit of claim 5, wherein the pixel cell is one of a plurality of pixel cells included in a pixel array arranged in rows and columns.

11. The pixel cell readout circuit of claim 10, wherein the specific capacitors that are included in the B capacitors of the first subset of capacitors and the specific capacitors that are included in the C capacitors of the second subset of capacitors are configured to be re-determined in response to the randomized pattern selection signal from the switch control circuit for each row readout of the pixel array.

12. The pixel cell readout circuit of claim 11, wherein the randomized pattern selection signal is configured to change up to a maximum number of the specific capacitors that are included in the B capacitors of the first subset of capacitors and the specific capacitors that are included in the C capacitors of the second subset of capacitors between each successive row readout of the pixel array, wherein the maximum number is less than the number of the plurality of capacitors, m.

13. The pixel cell readout circuit of claim 11, wherein the randomized pattern selection signal is configured to change a fixed number of the specific capacitors that are included in the B capacitors of the first subset of capacitors and the specific capacitors that are included in the C capacitors of the second subset of capacitors between each successive row readout of the pixel array.

14. The pixel cell readout circuit of claim 3, wherein the bitline input stage comprises an analog-to-digital conversion (ADC) circuit coupled to convert the image signal received from the pixel cell to a digital image signal.

15. The pixel cell readout circuit of claim 14, wherein the ADC circuit is a ramp type ADC circuit, wherein the ramp type ADC circuit includes a comparator having a first input and a second input, wherein one of the first and second inputs of the comparator is coupled to the bitline to receive the image signal from pixel cell, wherein an other one of the first and second inputs of the comparator is coupled to the first node of the capacitor ratio circuit.

16. The pixel cell readout circuit of claim 14, wherein the first input of the comparator is coupled to the bitline to receive the image signal from the pixel cell, wherein the second input of the comparator is coupled to the first node of the capacitor ratio circuit, wherein the second node of the capacitor ratio circuit is coupled to receive a ramp signal, wherein the third node of the capacitor ratio circuit is coupled to ground.

17. The pixel cell readout circuit of claim 16, wherein an analog gain of the ramp type ADC circuit is responsive to a sum of the total capacitance provided by the B capacitors of the first subset of capacitors coupled between the second node and the first node and the total capacitance provided by the C capacitors of the second subset of capacitors coupled between the first node and the third node divided by the total capacitance provided by the B capacitors of the first subset of capacitors coupled between the second node and the first node.

18. The pixel cell readout circuit of claim 14, further comprising an amplifier having an input and an output, wherein the input of the amplifier is coupled to the first node of the capacitor ratio circuit, wherein the output of the amplifier is coupled to the second node of the capacitor ratio circuit, wherein the third node of the capacitor ratio circuit is coupled to the bitline to receive the image signal from the pixel cell.

19. The pixel cell readout circuit of claim 18, wherein a gain of the amplifier is responsive to the total capacitance provided by the C capacitors of the second subset of capacitors coupled between the first node and the third node divided by the total capacitance provided by the B capacitors of the first subset of capacitors coupled between the second node and the first node.

20. The pixel cell readout circuit of claim 1, wherein each one of the plurality of capacitors has a unit capacitance.

21. An imaging system, comprising:
a pixel array including a plurality of pixel cells arranged in rows and columns, wherein each one of the pixel cells is coupled to generate an image signal in response to incident light;
a control circuit coupled to the pixel array to control operation of the pixel array; and
a readout circuit coupled to the pixel array to read out the image signals from the pixel array through bitlines, wherein the readout circuit comprises:
a bitline input stage coupled to a bitline to receive an image signal from a pixel cell;
a capacitor ratio circuit coupled to the bitline input stage, wherein a gain of the bitline input stage is responsive to a capacitor ratio provided by the capacitor ratio circuit to the bitline input stage, wherein the capacitor ratio circuit comprises:
a plurality of capacitors coupled to a first node of the capacitor ratio circuit that is coupled to an input of the bitline input stage, wherein a number of the plurality of capacitors is equal to m; and
a plurality of switches, wherein each one of the plurality of switches is coupled to a respective one of the plurality of capacitors, wherein each one of the plurality of switches is configured to independently couple the respective one of the plurality of capacitors to either a second node or a third node of the capacitor ratio circuit in response to the randomized pattern selection signal from the switch control circuit; and
the switch control circuit coupled to receive a gain signal, wherein the switch control circuit is coupled to generate the randomized pattern selection signal coupled to be received by the capacitor ratio circuit to select the capacitor ratio provided by the capacitor ratio circuit in response to the gain signal.

22. The imaging system of claim 21, further comprising function logic coupled to the readout circuit to store the image data read out from the pixel array.

23. The imaging system of claim 21, wherein the plurality of capacitors comprises a first subset of capacitors and a second subset of capacitors, wherein a number of the first subset capacitors is equal to B, a number of the second subset of capacitors is equal to C, and a sum of B and C is equal to m,
wherein the plurality of switches comprises a first subset of switches and a second subset of switches, wherein a number of the first subset of switches is equal to B, and a number of the second subset of switches is equal to C,
wherein the first subset of capacitors is coupled to the first node through first subset of switches and the second subset of capacitors is coupled to the second node through second subset of switches in response to the randomized pattern selection signal from the switch control circuit.

24. The imaging system of claim 23, wherein the capacitance ratio provided by the capacitance ratio circuit is responsive to a total capacitance provided by the B capacitors of the first subset of capacitors coupled between the second node and the first node and a total capacitance provided by the C capacitors of the second subset of capacitors coupled between the first node and the third node.

25. The imaging system of claim 23, wherein specific capacitors that are included in the B capacitors of the first subset of capacitors and specific capacitors that are included in the C capacitors of the second subset of capacitors are determined in response to the randomized pattern selection signal from the switch control circuit.

26. The imaging system of claim 25, wherein the switch control circuit comprises a pseudorandom number generator coupled to generate a pseudorandom number, wherein the switch control circuit is coupled to generate the randomized pattern selection signal in response to the pseudorandom number and the gain signal.

27. The imaging system of claim 26, wherein the switch control circuit further comprises:

a gain to set bit count generator coupled to receive the gain signal to generate a set bit count in response to the gain signal;

a validation block coupled to the pseudorandom number generator and the gain to set bit count generator, wherein the validation block is coupled to control the pseudorandom number generator to generate a valid pseudorandom number in response to the set bit count received from the gain to set bit count generator; and a lookup table coupled to the validation block and the gain to set bit count generator to generate the randomized pattern selection signal in response the valid pseudorandom number, the set bit count, and the gain signal.

28. The imaging system of claim 26, wherein the plurality of capacitors in the capacitor ratio circuit are arranged in an array of capacitors.

29. The imaging system of claim 28, wherein locations in the array of capacitors of the specific capacitors that are included in the B capacitors of the first subset of capacitors and locations in the array of capacitors of the specific capacitors that are included in the C capacitors of the second subset of capacitors are symmetrically located with respect to a center of the array of capacitors.

30. The imaging system of claim 29, wherein the number of the plurality of capacitors, m, is equal to an even number.

31. The imaging system of claim 26, wherein the specific capacitors that are included in the B capacitors of the first subset of capacitors and the specific capacitors that are included in the C capacitors of the second subset of capacitors are configured to be re-determined in response to the randomized pattern selection signal from the switch control circuit for each row readout of the pixel array.

32. The imaging system of claim 31, wherein the randomized pattern selection signal is configured to change up to a maximum number of the specific capacitors that are included in the B capacitors of the first subset of capacitors and the specific capacitors that are included in the C capacitors of the second subset of capacitors between each successive row readout of the pixel array, wherein the maximum number is less than the number of the plurality of capacitors, m.

33. The imaging system of claim 31, wherein the randomized pattern selection signal is configured to change a fixed number of the specific capacitors that are included in the B capacitors of the first subset of capacitors and the specific capacitors that are included in the C capacitors of the second subset of capacitors between each successive row readout of the pixel array.

34. The imaging system of claim 24, wherein the bitline input stage comprises an analog-to-digital conversion (ADC) circuit coupled to convert the image signal received from the pixel cell to a digital image signal.

35. The imaging system of claim 34, wherein the ADC circuit is a ramp type ADC circuit, wherein the ramp type ADC circuit includes a comparator having a first input and a second input, wherein one of the first and second inputs of the comparator is coupled to the bitline to receive the image signal from pixel cell, wherein an other one of the first and second inputs of the comparator is coupled to the first node of the capacitor ratio circuit.

36. The imaging system of claim 34, wherein the first input of the comparator is coupled to the bitline to receive the image signal from the pixel cell, wherein the second input of the comparator is coupled to the first node of the capacitor ratio circuit, wherein the second node of the capacitor ratio circuit is coupled to receive a ramp signal, wherein the third node of the capacitor ratio circuit is coupled to ground.

37. The imaging system of claim 36, wherein an analog gain of the ramp type ADC circuit is responsive to a sum of the total capacitance provided by the B capacitors of the first subset of capacitors coupled between the second node and the first node and the total capacitance provided by the C capacitors of the second subset of capacitors coupled between the first node and the third node divided by the total capacitance provided by the B capacitors of the first subset of capacitors coupled between the second node and the first node.

38. The imaging system of claim 34, further comprising an amplifier having an input and an output, wherein the input of the amplifier is coupled to the first node of the capacitor ratio circuit, wherein the output of the amplifier is coupled to the second node of the capacitor ratio circuit, wherein the third node of the capacitor ratio circuit is coupled to the bitline to receive the image signal from the pixel cell.

39. The imaging system of claim 38, wherein a gain of the amplifier is responsive to the total capacitance provided by the C capacitors of the second subset of capacitors coupled between the first node and the third node divided by the total capacitance provided by the B capacitors of the first subset of capacitors coupled between the second node and the first node.

40. The imaging system of claim 21, wherein each one of the plurality of capacitors has a unit capacitance.

* * * * *